United States Patent
Gold et al.

(10) Patent No.: US 12,450,285 B1
(45) Date of Patent: Oct. 21, 2025

(54) QUANTIFICATION OF MUSIC GENRE SIMILARITY

(71) Applicant: Amazon Technologies, Inc., Seattle, WA (US)

(72) Inventors: Ilan Paul Gold, New York, NY (US); Chittaranjan Velambur Rajan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/534,129

(22) Filed: Dec. 8, 2023

(51) Int. Cl.
*G06F 16/60* (2019.01)
*G06F 16/215* (2019.01)
*G06F 16/635* (2019.01)
*G06F 16/64* (2019.01)
*G06F 16/901* (2019.01)
G06Q 30/0601 (2023.01)

(52) U.S. Cl.
CPC .......... *G06F 16/635* (2019.01); *G06F 16/215* (2019.01); *G06F 16/64* (2019.01); *G06F 16/9024* (2019.01); *G06Q 30/0631* (2013.01)

(58) Field of Classification Search
None
See application file for complete search history.

(56) References Cited

U.S. PATENT DOCUMENTS

| | | | |
|---|---|---|---|
| 11,928,145 B1* | 3/2024 | Shi | G06F 16/45 |
| 2005/0021470 A1* | 1/2005 | Martin | G06F 16/686 |
| 2021/0065001 A1* | 3/2021 | Miller-Frankel | G06F 16/683 |
| 2024/0012861 A1* | 1/2024 | Dektyarev | G06F 16/9535 |

OTHER PUBLICATIONS

Grover, et al., "node2vec: Scalable Feature Learning for Networks," Jul. 3, 2016, arXiv:1607.00653v1 [cs.SI], 10 pgs.

* cited by examiner

*Primary Examiner* — Jau Shya Meng
(74) *Attorney, Agent, or Firm* — Kilpatrick Townsend & Stockton LLP (57) ABSTRACT

Techniques are disclosed for generating an attribute embedding for a catalog of items. A computer system can determine pairwise relationships between attributes of items in a digital catalog. The computer system can use the pairwise relationships to generate a graph including attribute nodes. Each attribute node can be related to each other attribute node of the graph according to the pairwise relationships. The computer system can also generate an attribute embedding based on the graph. The computer system can then generate a collection of items from the items in the digital catalog using the attribute embedding.

20 Claims, 8 Drawing Sheets

QUANTIFICATION OF MUSIC GENRE SIMILARITY

BACKGROUND

Modern media products like streaming music services can provide users with customized playlists of associated songs based on limited user input. Such services can customize the playlists based on users specifying the artists and genres that they prefer. The users are then able to listen to songs that match their selected preference.

However, grouping media content like songs according to qualitative descriptors like genre in an automated manner can be difficult. There is a need in the art for techniques to quantify the qualitative relationships between such content.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Online service providers can provide multiple streaming or on-demand media services like music, movies, and television. The service providers can create a selection of media to stream to users based on user preferences, predictions about user preferences, and associations between the media. For example, a service provider can maintain a catalog of songs from multiple artists in multiple genres. The service provider can create a "station" of music for a user in which all of the songs are related by artist, genre, mood, or other attribute of the songs. The genres can include "rock," "salsa," "contemporary," "Latin," and the like. Users can indicate their preferences to the service provider for a particular artist, genre, mood, or other attribute, and the service provider can create the stations or other collections of songs based on those preferences.

However, attributes like genre can be qualitative and subjective. Typically, the songs maintained in a catalog are labeled with one or more genres (and/or other attributes) based on external input. For example, music publishers can identify artists and their songs with particular genres, or experts or other users can identify genres for individual songs so that the genres are tagged by expert review and/or consensus. The service providers can group songs based on matching the indicated user preferences to the labels but may be limited in intelligently and efficiently predicting songs that a user may prefer but may not exactly match the indicated preferences. Moreover, the maintained attributes for the songs may not be accurate, resulting in songs misidentified with incorrect or inaccurate genres. Thus, conventional recommender systems used to provide collections of songs or other media content to a user may create collections that include outliers that do not mesh well with the other media in the collection, resulting in both a poor user experience and an increased expenditure of computing resources as the user interacts with a media playing device to reject the outlier media and/or provide additional preference information for the service provider to analyze.

Embodiments of the present disclosure are directed to techniques to generate a genre embedding that quantifies and encodes similarity information between all identified genres of music associated with artists for songs in a catalog. In particular, the techniques described herein include a computer system that can execute an attribute similarity engine to generate the genre embedding (or other attribute embedding) using metadata labels for the attributes (e.g., genre, mood, etc.) for all the songs in the catalog. The attribute similarity engine can take a set of artists and genres of songs produced by the artists and identify pairwise relationships for each genre of each artist. The attribute similarity engine can then build a graph consisting of nodes for each genre in the catalog (e.g., 1,100 genres), with each node related to each other node by a value corresponding to the number of identified pairwise relationships between the two genres. The attribute similarity engine can apply a network feature learning algorithm to the graph to generate the genre embedding, which can be, for example, a 64-dimensional vector space embedding. Once generated, the genre embedding can be used by the computer system to take actions based on the similarity information in the genre embedding, including filtering or ranking a collection of related songs (e.g., songs to stream to a user in succession) to remove dissimilar songs, generating a new collection of songs that have similar genres according to the genre embedding, or identify and correct inaccurate genre labels within the catalog at both the artist level and the song level.

To illustrate with specific example, a user may access a music streaming service to stream a series of songs based on the user's preference for "Pop." The music streaming service may generate the series of songs using a conventional recommendation system (e.g., a collaborative filtering model). The series of songs may include outlier songs that are dissimilar from "Pop" (e.g., "R&B") based on the output of the conventional recommender. Using the genre embedding, a computer system of the present disclosure can refine the series of songs by determining a similarity between the genres of the series of songs and the genre of Pop to identify the top 250 most similar songs to Pop of the series of songs. These top 250 songs may then be streamed to the user.

The techniques described herein can provide numerous technological advantages over a conventional recommender system. As one example, generating improved collections of songs or other media items for a user can improve the user's interaction with the user device. A user streaming songs with their smartphone may do so in the background while engaged in other computing tasks (e.g., using a web browser application). If the collection of songs includes outliers that the user does not prefer, the user may stop their first computing task, access the media application playing the songs, interact with the media application to skip the outlier song, and then return to the first computing task, each action of which incurs excess computational resources when compared with the user not being induced to handle the outlier songs. The user may also be induced to interact with the streaming service to provide additional information in an attempt to create an improved streaming experience, resulting in the streaming service processing additional information to update the user preferences. By providing a filtered collections of songs using a genre embedding as described herein, excess user interactions with a user device to repeatedly skip outlier songs, including the concomitant excess transmission, processing, and storage of associated data, may be reduced or avoided.

As another example, the computer system can generate the genre embedding much more quickly and computationally efficiently than a computer system can generate genre embeddings using a conventional collaborative filtering model with a neural network. A conventional neural network collaborative filtering model using user co-occurrence data for one year of song plays for a user can generate a conventional genre embedding in approximately 12 hours. By comparison, the computer system implementing the attribute similarity engine as described herein can generate the genre embedding from the catalog in approximately two minutes. In addition, because musical genres for songs produced by artists may be co-relevant, rather than processing the data from the catalog at the song level, the computer system can process the data from the catalog at the artist level, producing a high-quality genre embedding that can avoid encoding inaccurate genre labels for individual songs in the catalog.

Although embodiments of the present disclosure are described with an exemplary case of songs and musical genres, the techniques described herein can also be applied to other media and other general items maintained in a catalog and associated with attributes. For example, the media items may be books, television shows, films, and the like that can have a genre attribute that can be encoded into a genre embedding. As another example, the items may be products offered for retail sale from a catalog of such items, with the items having attributes like type and manufacturer that can be encoded into an attribute similarity engine. Items that are particularly amendable to the techniques of the present disclosure include items in which one attribute of the items can act as a proxy for the individual items. As discussed above, an artist may be an accurate proxy for the songs of that artist, so that genres associated with the artist can produce an accurate genre embedding rather than analyzing the genres associated with each song of a catalog. Similar attribute relationships may exist for books (e.g., author/genre), films (e.g., production company/genre), and retail items (e.g., manufacturer/type).

Figure 1:
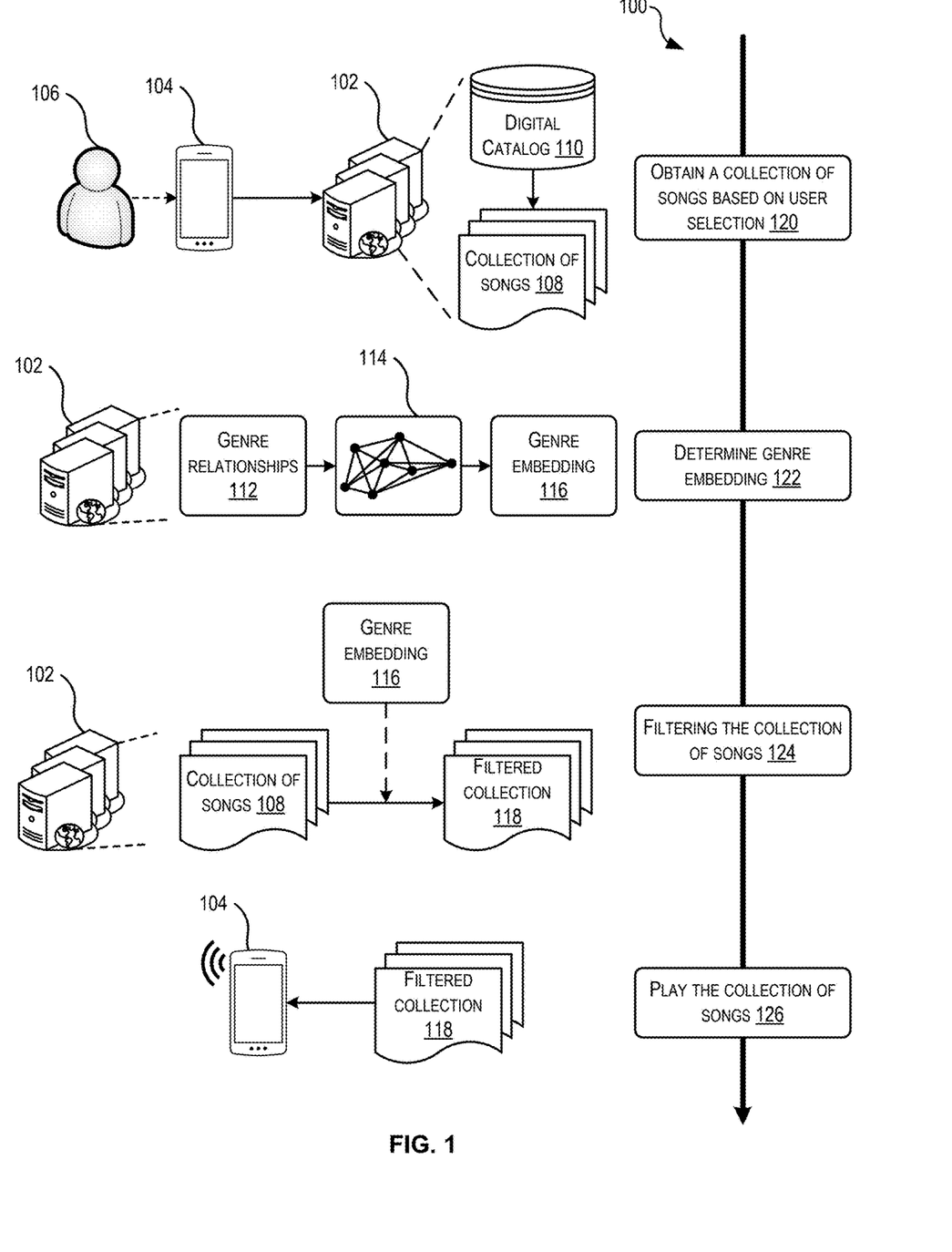
FIG. 1 is a block diagram and associated flow chart of an example process to generate a genre embedding to filter a collection of related songs for playback at a user device, according to some embodiments.

Turning now to the figures, FIG. 1 is a block diagram and associated flow chart of an example process 100 to generate a genre embedding 116 to filter a collection of related songs (e.g., collection of songs 108) for playback at a user device 104, according to some embodiments. The diagram shows elements of a computer system corresponding to the blocks of process 100. The process can be performed by a computer system, which can include a server device 102 and a user device 104. Additional details about different computer systems that are capable of performing the techniques of the disclosure are provided below with respect to FIGS. 6 and 8. In some embodiments, the server device 102 can generate the genre embedding 116 as part of an attribute similarity engine. The server device 102 may be a component of a system of a service provider that can provide content (e.g., services, media, items, etc.) to the user device 104, including streaming media at an output of the user device 104, graphical elements for display at a GUI of the user device 104, and/or network pages of a website of the service provider. The service provider may be a media content provider for streaming and/or on demand music, videos, or other content, an e-commerce provider, or a provider of combinations of similar content.

The process 100 may begin at block 120 with the server device 102 obtaining a collection of songs 108 based on input from a user 106 at a user device 104. The input can be a selection of a musical genre usable by a service provider to generate a station of related songs to play for the user 106 as part of a streaming music service. For example, the service provider may use a recommender system to determine a collection of songs 108 from a digital catalog 110 of all songs available with the service provider. The recommender system may use a collaborative filtering model to generate the collection of songs 108. For example, the selection of the musical genre by the user 106 may be used as an input into the collaborative filtering model to identify the songs in the digital catalog 110 that are associated with the selected genre and relevant to the user 106 based on selections by similar users of the service provider. In other examples, the collection of songs 108 may correspond to all songs associated with the selected genre or may be a predetermined collection of songs based on previous interactions from the user 106 with the service provider.

At block 122, the server device 102 can determine the genre embedding 116. The server device 102 can identify genre relationships 112 for the songs in the digital catalog 110. For example, for each artist of songs in the digital catalog 110, the server device can obtain a list of all genres associated with the artist. In some embodiments, the genres for each artist may be determined by experts or other user that identify genres for an artist. For example, experts may assign genre labels to each artist in the digital catalog 110. The server device 102 may maintain the genre labels as part of the digital catalog 110. Identifying the genre relationships 112 can include determining pairwise relationships for each genre associated with each artis. Additional detail for determining the genre relationships 112 is provided below with respect to FIG. 2.

The server device 102 can generate a graph 114 using the genre relationships 112. The graph 114 can represent each genre as a node. Each edge of the graph 114 between every pair of nodes can correspond to the number of genre relationships determined for each artist that was also determined with at least one other artist. For example, if one artist is associated with the genres "Latin" and "Latin pop," and another artist is also associated with the genres "Latin" and "Latin pop," then there is a pairwise genre relationship between "Latin" and "Latin pop" that is associated with at least two artists. The graph 114 can then connect a node for the "Latin" genre with the node for the "Latin pop" genre with a corresponding value of "1," indicating one instance of the genre relationship associated with two artists. If a third artist is also associated with both the "Latin" and "Latin pop" genres, then the graph 114 can connect the nodes for "Latin" and "Latin pop" with a corresponding value of "2," and so on for all the artists in the digital catalog 110. Additional details about generating the graph 114 are provided below with respect to FIG. 3. In some embodiments, the genre relationships 112 may be determined at the song level (rather than for the artists as a proxy for individual songs). In these embodiments, the pairwise genre relationships shared between each two songs may be used to determine the value corresponding to the edge between the genres in the graph 114.

The server device 102 can use the graph 114 to generate the genre embedding 116. The server device can apply a network feature learning algorithm to the graph 114 to generate the genre embedding 116. As a particular example, the network feature learning algorithm may be the "node2vec" algorithm that can efficiently process a graph of nodes to generate feature embeddings for the nodes. The genre embedding 116 can encode information about the similarity of genres that have "strong" connections in the graph. The genre embedding 116 may be an embedding in 64 dimensional vector space.

At block 124, the server device can filter the collection of songs 108 using the genre embedding 116. Filtering the collection of songs 108 can include determining a similarity between the genres associated with each song of the collection of songs 118 and one or more genres requested by a user, or determined by another system as relevant for the user, using the similarity information encoded in the genre embedding 116. The similarity may be a cosine similarity, a negative dot product similarity, or other similarity measure. The similarities may be ranked to identify a predetermined number (e.g., 250) of the most similar songs (e.g., songs most similar to the genre or genres of a seed song or a seed genre indicated by the user input). These most similar songs may constitute the filtered collection of songs 118.

At block 126, the server device 102 can cause the user device 104 to play the filtered collection of songs 118. For example, a first song of the filtered collection of songs 118 may be sent to (or streamed to) the user device 104 from the server device 102 to be played at the user device 104.

Figure 2:
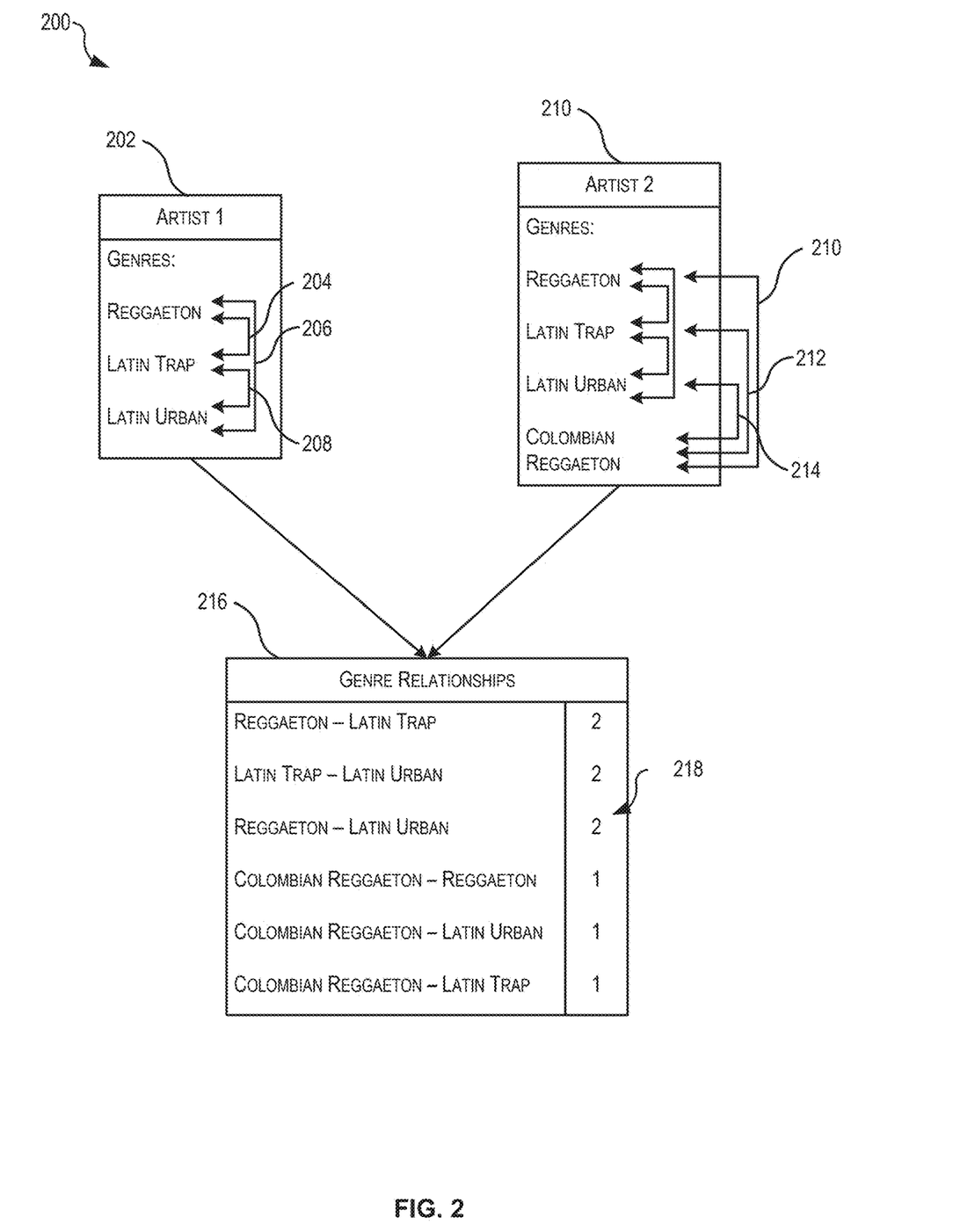
FIG. 2 is a diagram illustrating pairwise relationships between genres associated with artists in a digital catalog, according to some embodiments.

FIG. 2 is a diagram illustrating a process 200 for determining pairwise relationships 204-214 between genres associated with artists in a digital catalog (e.g., digital catalog 110 of FIG. 1), according to some embodiments. The process 200 may be performed by a server device or other computer system described herein, including server device 102 of FIG. 1.

As depicted in FIG. 2, the digital catalog can maintain genre metadata for two artists, Artist 1 202 and Artist 2 210. The genre metadata can include one or more genres associated with each artist, independent of the number of songs from each artist in the digital catalog. The genre metadata may be provided by expert user input or other user input. In some examples, the genre metadata may be obtained from genre labels for each artist's songs in the digital catalog. For example, Artist 1 202 may be associated with the genres of "Reggaeton," "Latin trap," and "Latin urban," while Artist 2 210 may be associated with the genres of "Reggaeton," "Latin trap," "Latin urban," and "Colombian Reggaeton."

The computer system can determine pairwise relationships of the musical genres associated with Artist 1 202 and Artist 2 210. Artist 1 202 corresponds to pairwise relationship between "Reggaeton" and "Latin trap," pairwise relationship 206 between "Reggaeton" and "Latin urban," and pairwise relationship 208 between "Latin trap" and "Latin urban." Artist 2 corresponds to the same pairwise relationships 202-208 for the genres "Reggaeton," "Latin trap," and "Latin urban," as well as pairwise relationship 210 between "Reggaeton" and "Colombian Reggaeton," pairwise relationship 212 between "Latin trap" and "Colombian Reggaeton," and pairwise relationship 214 between "Latin urban" and "Colombian Reggaeton." Determining the pairwise relationships can proceed similarly for every artist and associated genres for the digital catalog, which can include, for example, hundreds of thousands of artists and over a thousand identified genres.

The computer system can then compute values 218 that correspond to the occurrence of pairwise relationships 204-214 between each different pair of artists. In the simplest case, the values 218 can include a count of each occurrence. In other examples, the values 218 may be a count of co-occurrences between at least two artists or a weighted value of each co-occurrence, where the weighting may be determined based on additional information about the artists, genres, or the users. For example, co-occurrences with artists with more songs in the digital catalog for a given genre may be weighted more than co-occurrences between artist with fewer songs in the digital catalog. The values for each pairwise relationship between the genres can be combined to generate the genre relationships 216, which may be an example of genre relationships 112 of FIG. 2.

For the example depicted in FIG. 2, the genre relationships 216 for Artist 1 202 and Artist 2 210 include values of "2" for the pairwise relationships 204-208 of "Reggaeton—Latin trap," "Latin trap—Latin urban," and "Reggaeton-Latin urban," corresponding to the co-occurrence of the pairwise relationships 204-208 between both Artist 1 202 and Artist 2 210. The genre relationships 216 also include values of "1" for the pairwise relationships 210-24 of "Colombian Reggaeton—Reggaeton," "Colombian Reggaeton—Latin urban," and "Colombian Reggaeton—Latin trap," since these pairwise relationships only occur with Artist 2 210.

Figure 3:
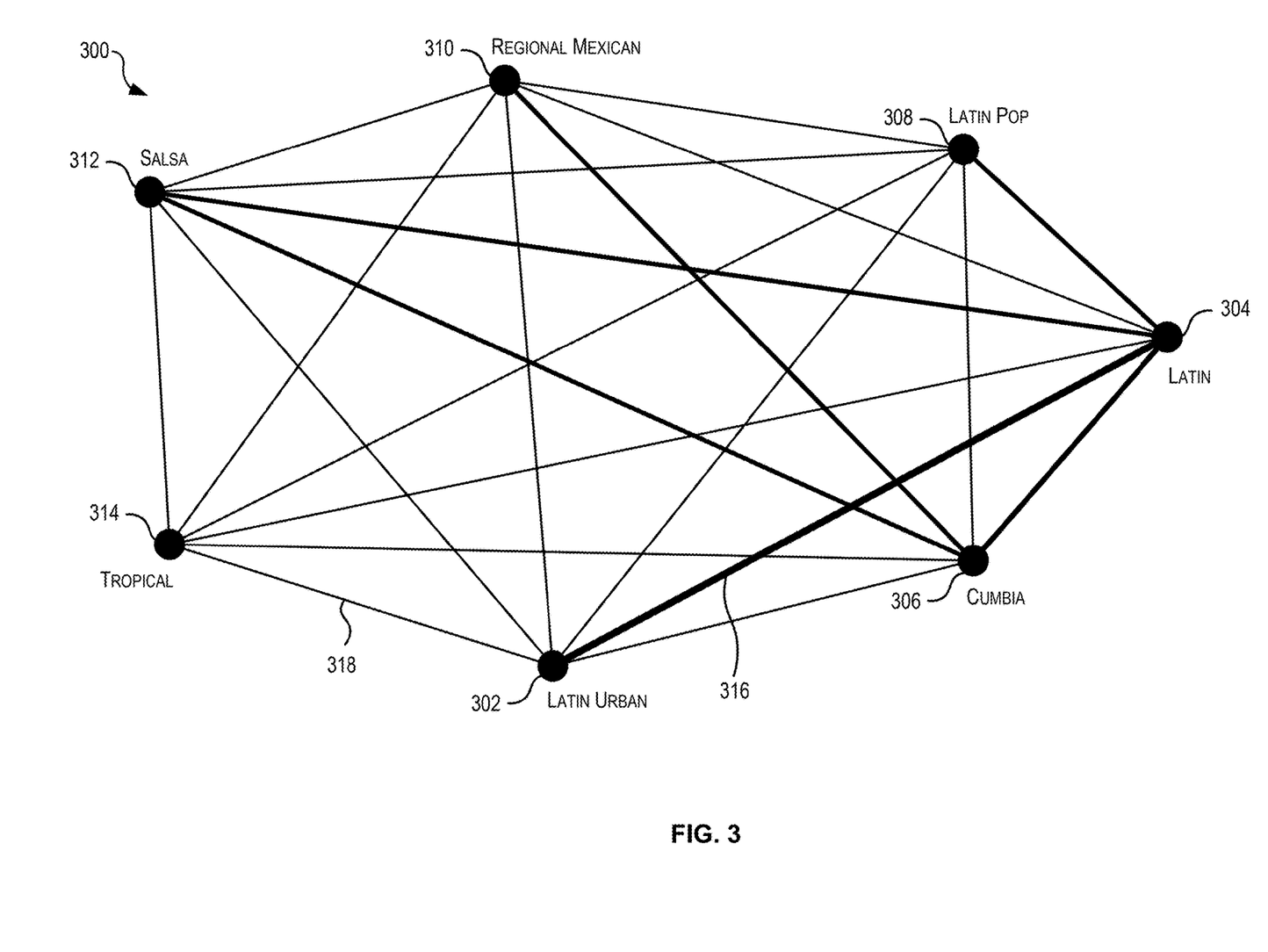
FIG. 3 is a diagram illustrating a graph generated from pairwise relationships between genres, according to some embodiments.

FIG. 3 is a diagram illustrating a graph 300 generated from pairwise relationships between genres, according to some embodiments. A computer system (e.g., server device 102 of FIG. 1) can generate the graph 300 using genre relationships (e.g., genre relationships 216 of FIG. 2).

The graph 300 may represent the connections between nodes for various genres. As depicted in FIG. 3, the graph 300 can include seven nodes. Node 302 may represent the "Latin urban" genre, node 304 may represent the "Latin" genre, node 306 may represent the "Cumbia" genre, node 308 may represent the "Latin pop" genre, node 310 may represent the "Regional Mexican" genre, node 312 may represent the "Salsa" genre, and node 314 may represent the "Tropical" genre. The graph 300 may be a portion of a larger graph of associations between hundreds or thousands of genres. In some embodiments, rather than genres, the nodes of graph 300 may be other attributes of items in a digital catalog. For example, the nodes may represent the attribute of an item type for items in a retail digital catalog.

Each of the nodes 302-314 of the graph 300 may be connected to each other node by an edge, including edge 316 and edge 318. Each edge may represent a value (e.g., values 218 of FIG. 2) corresponding to the pairwise relationship between the nodes connected by the edge. For example, each edge may correspond to the number of co-occurrences between artists for the genre pairs. For the purposes of visualization, the edges of graph 300 have been thickened according to the corresponding value, so that thicker edge lines represent higher values for the number of co-occurrences of the pairwise relationships. For example, edge 316 between "Latin" and "Latin urban" is thicker than edge 318 between "Latin urban" and "Tropical," because the number of co-occurrences of pairwise relationships between "Latin" and "Latin urban" may be higher than the number of co-occurrences of pairwise relationships between "Latin urban" and "Tropical" for artists in a digital catalog.

Figure 4:
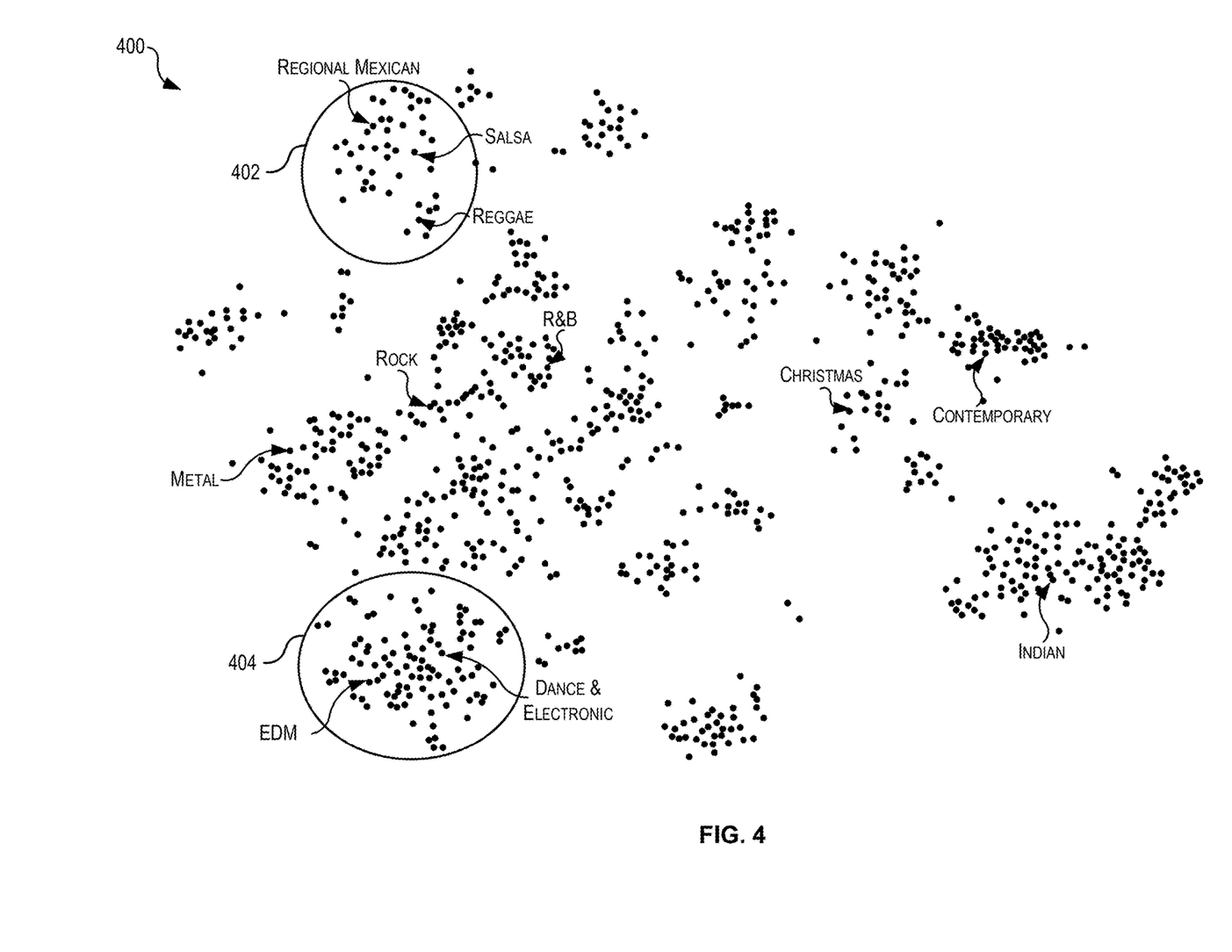
FIG. 4 is a reduced dimension projection of a genre embedding, according to some embodiments.

FIG. 4 is a reduced dimension projection 400 of a genre embedding (e.g., genre embedding 116 of FIG. 1), according to some embodiments. As discussed above, the genre embedding may encode genre similarity information in an N-dimensional vector space (e.g., a 64-dimensional vector space), in which the values correspond to the nodes of a graph (e.g., graph 300). The reduced dimension projection 400 illustrated in FIG. 4 may be a projection of an N-dimensional embedding into two dimensions. The genre embedding may be generated using the graph.

Each point of the reduced dimension projection 400 can correspond to one of the nodes of the graph, which in turn correspond to one musical genre. Because the nodes of the graph are related to the other nodes of the graph based on the pairwise relationships identified between the genres. Because of the relationships, genres that are similar to one another may be clustered "close" together in the reduced dimension projection 400. For example, the "Regional Mexican" genre may be in a cluster 402 with the "Salsa" and "Reggae" genres, while the "Electronic Dance Music (EDM)" genre may be in a cluster 404 with the "Dance & Electronic" genre. The cluster 402 may be relatively "far" from the cluster 404 due to dissimilarity between the genres in each cluster from one another.

Figure 5:
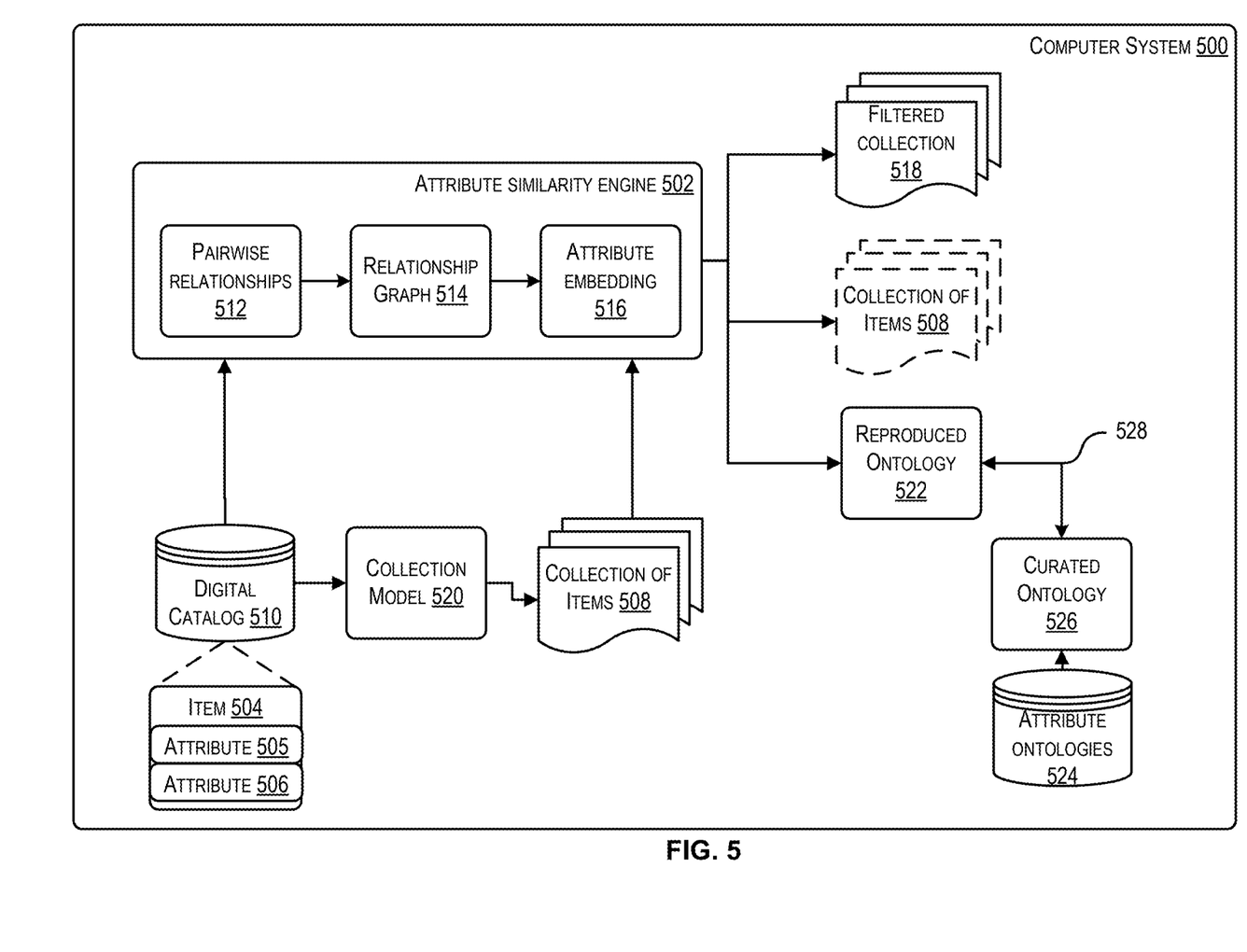
FIG. 5 is an example architecture of a computer system for generating an attribute embedding, according to some embodiments.

FIG. 5 is an example architecture of a computer system 500 for generating an attribute embedding 516, according to some embodiments. The computer system 500 can include the server device 102 and/or user device 104 of FIG. 1. The computer system 500 can be a computer system of a service provider of streaming and/or on demand media content like music, video, or books, or may provide online retail of items. FIG. 5 uses arrows to depict a general flow of data between components of the computer system 500 for various operations of processes that computer system 500 can perform in accordance with embodiments of the present disclosure. However, the arrows are not intended to be construed as a limiting arrangement for the connectivity between any components.

The computer system 500 can include an attribute similarity engine 502 and a digital catalog 510. The attribute similarity engine 502 may be configured to perform operations including determining pairwise relationships 512 between attributes for items in the digital catalog 510, generating a relationship graph 514 from the pairwise relationships 512, and generating an attribute embedding 516 from the relationship graph 514. The pairwise relationships 512, relationship 514, and attribute embedding 516 may be examples of genre relationships 112, graph 114, and genre embedding 116, respectively, described above with respect to FIG. 1.

The digital catalog 510 may store data describing a plurality of items that the service provider can provide to users via the computer system 500. For example, the items may be songs and the data can include both the song data and metadata labels for the songs that identify the song titles, artists, genres, intrinsic musical values like instruments, tempo, musical key for the songs, and/or other labels like mood. As depicted in FIG. 5, an item 504 of the digital catalog 510 may be associated with metadata labels including attribute 1 505 and attribute 2 506. The item 504 may be a song, so that attribute 1 505 can be the artist that made the song and attribute 2 506 can be the genre of the song. In other examples, the items in the digital catalog 510 can include books (with data including the book text and metadata describing authors, genres, publishers, etc.) or items for sale from an online retailer (with the data including metadata describing the item name, item type, manufacturer, etc.).

The computer system 500 can also include a collection model 520. The collection model 520 can determine the collection of items 508 to provide to a user based on the user input. The collection model 520 may be a collaborative filtering model that can take user information for a user (e.g., user 106 of FIG. 1) of a service provider and user information for other users of the service provider to predict particular items from the digital catalog that may be relevant to the user. For example, a user may interact with a user device to select a musical genre to have a streaming music service provide songs to the user device similar to the selected genre. The streaming music provider can use a collaborative filtering model to compute a similarity value (e.g., a cosine similarity, Pearson correlation, Jaccard similarity, mean squared difference, or other measure of similarity) between the user's selection of the musical genre and other selections by the other users of the streaming music service. Based on the similarity of the users, the streaming music service can predict the songs that are preferred by the user based on the selection of the musical genre and the similarity value between the user and other users.

After obtaining the collection of items 508, the computer system 500 can use the attribute similarity engine 502 and the attribute embedding 516 to filter the collection of items 508 to produce a filtered collection of items 518. Filtering the collection of items 508 can include determining a similarity between an attribute associated with each item of the collection of items 508. In some embodiments, filtering the collection of items 508 can also include determining a similarity between the attribute and another attribute that serves as a proxy for the items. For example, the artist of several songs may be a proxy attribute for the several songs, so that the attribute of a musical genre can be associated with the artist. The computer system 500 can use the similarity information encoded in the attribute embedding 516 to determine which items of the collection of items 508 is most similar to a user preference (e.g., the user selection of a musical genre, an attribute of a user selected retail item, etc.). The similarity may be a cosine similarity, a negative dot product similarity, or other similarity measure. The similarities may be ranked to identify a predetermined number of the most similar items (e.g., songs most similar to the genre or genres of a seed song or a seed genre indicated by the user input). These most similar items may constitute the filtered collection of items 518.

In some embodiments, filtering the collection of items can include determining a number of attributes that are most similar to an initial attribute. The initial attribute may be a user selected attribute (e.g., a user-selected musical genre). The computer system 500 can determine a similarity value (e.g., a cosine similarity, a negative dot product, etc.) between the initial attribute and the other attributes using the attribute embedding. The computer system 500 can then determine a first number of the most similar attributes based on the similarity values and then select items from the collection of items that have an attribute from the most similar attributes.

In some embodiments, the attribute embedding 516 may be input into the collection model 520 (e.g., input into a collaborative filtering model) to generate the filtered collection of items 518. For example, an embedding generated and used by the collaborative filtering model may be replaced with the attribute embedding 516 to produce the filtered collection of items 518.

In some embodiments, the computer system 500 can use the attribute similarity engine 502 to generate the collection of items 508 instead of the collection model 520 described above. For example, rather than filtering the collection of items 508 using the attribute embedding 516, the attribute similarity engine 502 can generate the collection of items 508 by determining a number of items from the digital catalog 510 that are most similar to an initial attribute, which may be an indicated user preference, a user selection of a musical genre, a user selection of an item with an attribute, or the like. For example, the attribute similarity engine 502 can use the attribute embedding to determine a similarity value (e.g., cosine similarity, negative dot product, etc.) between an attribute of each item from the digital catalog and an attribute from the indicated user preference. The attribute similarity engine 502 can then rank the items according to the similarity values and select the number of items with the highest similarity values.

In some embodiments, the computer system 500 can be configured to evaluate a quality of the attribute embedding 516. The computer system may store attribute ontologies 524 for the various attributes used to label and describe the items in the digital catalog 510. An attribute ontology may be a predefined relationship between one or more attributes and one or more other attributes for the items of the digital catalog. For example, for a digital catalog of songs, the genres for the songs may be characterized by an ontology that associates parent genres with sub-genres. For instance, a genre ontology my define the genre of "Pop" as having the sub-genres of "Latin Pop," "Folk Pop," "K-Pop," and "Country Pop," while the genre of "Latin" can have the sub-genres of "Latin Pop" and "Latin urban." The attribute ontologies may be defined by input from expert users or other users rather as "curated" ontologies and may reflect expert users' judgment that the parent attributes are similar to the sub-attributes. To evaluate whether the attribute embedding 516 adequately captures similarity information between attributes, the attribute similarity engine 502 can generate a reproduced ontology 522. The reproduced ontology 522 can include a similarity value between parent attributes and sub-attributes. The computer system 500 can compare 528 the reproduced ontology with a curated ontology 526 from the attribute ontologies 524. For a parent attribute in the curated ontology 526, the computer system can determine if the reproduced ontology 522 includes a sub-attribute in a predetermined number (e.g., ten) of the most similar attributes to the attribute. If the sub-attribute is in the predetermined number of most similar attributes to the receiving a curated ontology, then the quality of the attribute embedding 516 may be high.

In some embodiments, the computer system 500 can be configured to update metadata labels for items in the digital catalog 510. The computer system 500 can use the attribute embedding 516 to identify inaccurate attribute labels for one or more items in the digital catalog and update the identified labels with a more accurate attribute value. For example, item 504 may be a song from an artist and tagged (e.g., by previous user input) with the genres of "Latin," "Latin pop," and "Metal." Using the attribute embedding 516, the computer system 500 can determine that the genre of "Metal" is dissimilar to the genres of "Latin" and "Latin pop," and is therefore an inaccurate genre for the song. The computer system can then determine another genre label using the attribute embedding 516 that is most similar to the remaining genres of the song and other genres associated with the artist to determine an updated genre for the song. The computer system 500 can also be configured to update the attribute embedding 516 using the updated metadata labels to further improve the quality of the attribute embedding 516.

Figure 6:
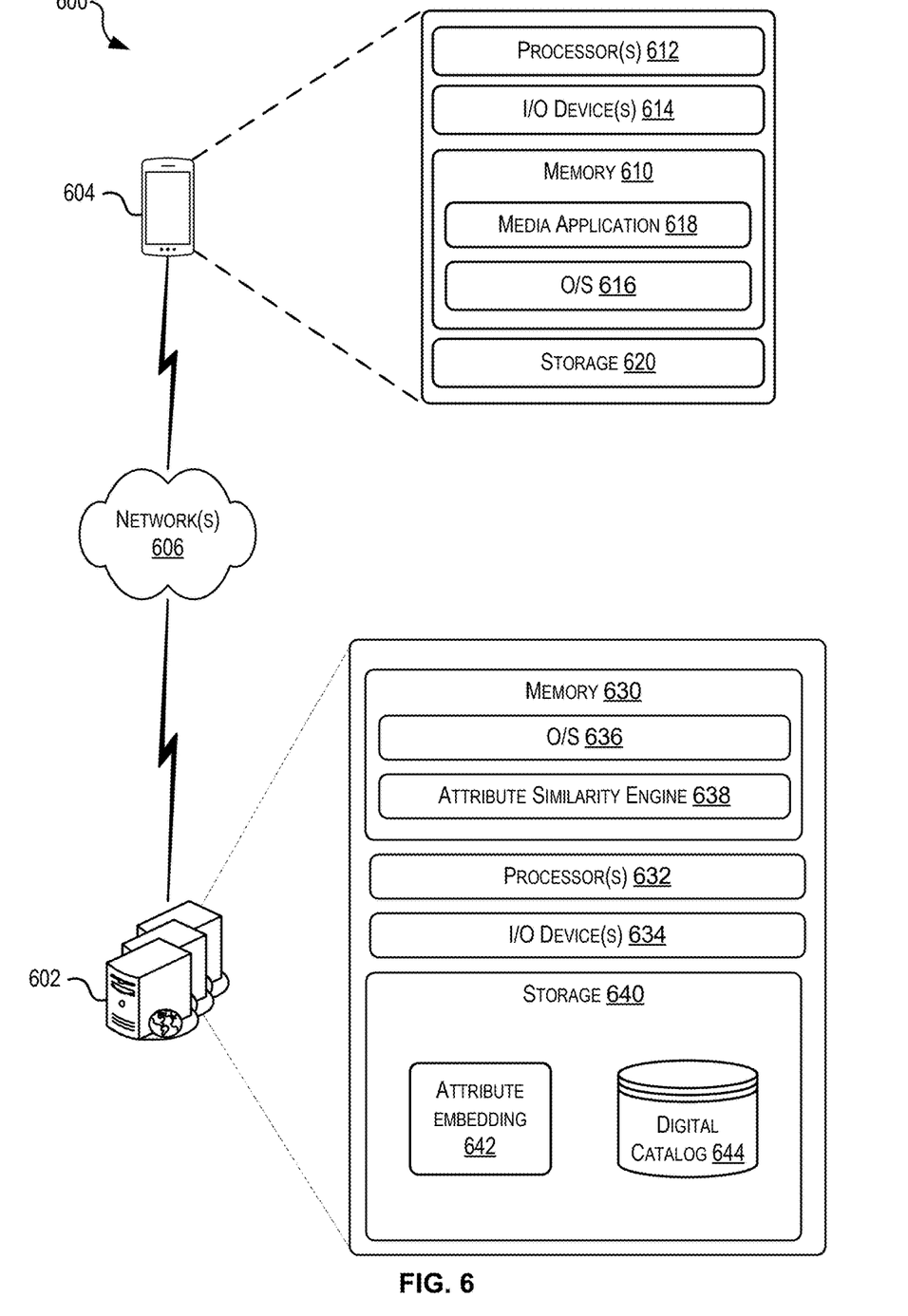
FIG. 6 is a block diagram illustrating another example architecture of a computer system, including a plurality of components that may perform functions in accordance with at least one embodiment.

FIG. 6 is a block diagram illustrating another example architecture of a computer system 600, including a plurality of components that may perform functions in accordance with at least one embodiment. The computer system 600 includes a server system 602, a user device 604, and one or more network(s) 606. The server system 602 may be an example of other server systems or computer systems described herein, including computer system 500 of FIG. 5 and server system 102 of FIG. 1. User device 604 may be an example of other user devices described herein, including user device 104 of FIG. 1. The server system 602 can include one or more computing devices, including remote devices, cloud devices, and virtual machines, and may host attribute similarity engine 638, which may be an example of attribute similarity engine 502 of FIG. 5. The network(s) 506 may include any one or a combination of many different types of networks, such as cable networks, the Internet, wireless networks, cellular networks, and other private and/or public networks.

As described herein, the user device 604 can have at least one memory 610, one or more processor(s) 612, and one or more input/output ("I/O") device(s) 614. The processor(s) 612 can include Field-Programmable Gate Arrays (FPGAs), application-specific integrated circuits (ASICs), or a microprocessors. The processor(s) 612 can execute instructions stored in memory to perform operations. In some examples, the instructions can include processor-specific instructions generated by a compiler or an interpreter from code written in any suitable computer-programming language, such as C, C++, C#, and Java. The I/O device(s) 614 can include displays, monitors, touch screens, mouse, keyboard, microphones, speakers, or other I/O device.

The memory 610 may store program instructions that are loadable and executable on the processor(s) 612, as well as data generated during the execution of these programs including user preferences, media content, and the like. Depending on the configuration and type of user device 604, the memory 610 may be volatile (such as random access memory ("RAM")) or non-volatile (such as read-only memory ("ROM"), flash memory, etc.). In some implementations, the memory 610 may include multiple different types of memory, such as static random access memory ("SRAM"), dynamic random access memory ("DRAM") or ROM. The user device 604 may also include additional storage 620, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some embodiments, the storage 620 may be utilized to store data contents received from one or more other devices (e.g., server system 602). For example, the storage 620 may media content (e.g., a collection of songs or an identification of a collection of songs) provided by the server system 602 and sent to the user device 604 to present content from a service provider to be played from a filtered collection of songs.

The memory 610 may include an operating system (O/S) 616 and one or more application programs, modules, or services for implementing the features disclosed herein, including a media application 618. The media application 618 may be configured to interface with one or more components of a service provider's computer system (e.g., server system 602) to send user indications or selections of items, songs, or other content to determine an attribute for use by the service provider's computer system when determining a collection of items to present at the user device 604. The media application 618 may, in some embodiments, be an application associated with the service provider (e.g., a streaming music player for a music service, a video media player application for a video content provider, a store application for an online retailer, etc.) configured to receive content from the server system 602, including collections of items grouped according to relationships between attributes. The collection of items may be presented at one of the I/O device(s) 614 (e.g., a speaker, a display). In some examples, the media application 618 may be a web browser application for receiving web pages for interacting with a service provider's interface. For example, a user may interact with a streaming music service via a web page presented by the media application 618 at a display of the user device 604 to select a musical genre preferred by the user. The media application 618 may receive user input data corresponding to interactions with content presented at the user device 604.

Turning now to server system 602 in more detail, the server system 602 can be any suitable type of computing device including, but not limited to, a laptop computer, a desktop computer, a mobile phone, a smartphone, a server computer, etc. In some embodiments, the server system 602 is executed by one or more virtual machines implemented within a cloud computing or other hosted environment. The cloud computing environment may include provisioned computing resources like computing, storage, and networking. The server system 602 can communicate with the user device 604 via the network(s) 506 or other network connections. The server system 602 may be configured to implement the functionality described herein as part of a distributed computing environment.

The server system 602 can include a memory 630, one or more processor(s) 632, I/O devices 634, and at least one storage unit 640. As with the processor(s) 612 of user device 604, the processor(s) 632 can include FPGAs, ASICs, or a microprocessors. The processor(s) 632 can execute instructions stored in memory to perform operations. In some examples, the instructions can include processor-specific instructions generated by a compiler or an interpreter from code written in any suitable computer-programming language, such as C, C++, C#, and Java. The memory 630 may store program instructions that are loadable and executable on the processor(s) 632, as well as data generated during the execution of these programs. Depending on the configuration and type of memory included in the server system 602, the memory 630 may be volatile (such as RAM) and/or non-volatile (such as read-only memory ("ROM"), flash memory, or other memory). In some embodiments, the storage 640 may include one or more databases, data structures, data stores, or the like for storing and/or retaining information associated with the server system 602 or the user device 604. The storage 640 may store, for example, digital catalog information (e.g., information for digital catalog 510 of FIG. 5), attribute ontologies (e.g., attribute ontologies 524 of FIG. 5), and attribute embeddings (e.g., attribute embedding 516 of FIG. 5).

The memory 630 may include an operating system (O/S) 636 and one or more application programs, modules, or services for implementing the features disclosed herein, including attribute similarity engine 638. The attribute similarity engine 638 may be configured to generate, an attribute embedding using attributes for items from a digital catalog by determining pairwise relationships between the attributes, generating a graph including nodes corresponding to the attributes, then applying a network feature learning algorithm to the graph to generate the attribute embedding.

In some embodiments, some, any, all, or various combinations of the functionality described above with respect to the server system 602 can be performed on the user device 604. For example, the user device 604 can implement an attribute similarity engine that can be configured to perform operations similar to those described above with respect to attribute similarity engine 638 and/or systems implementing an attribute similarity engine described herein. For example, generated attribute embedding may be transmitted to the user device 604 so that the user device can determine a filtered collection of items using the attribute embedding and a provided collection of items.

Figure 7:
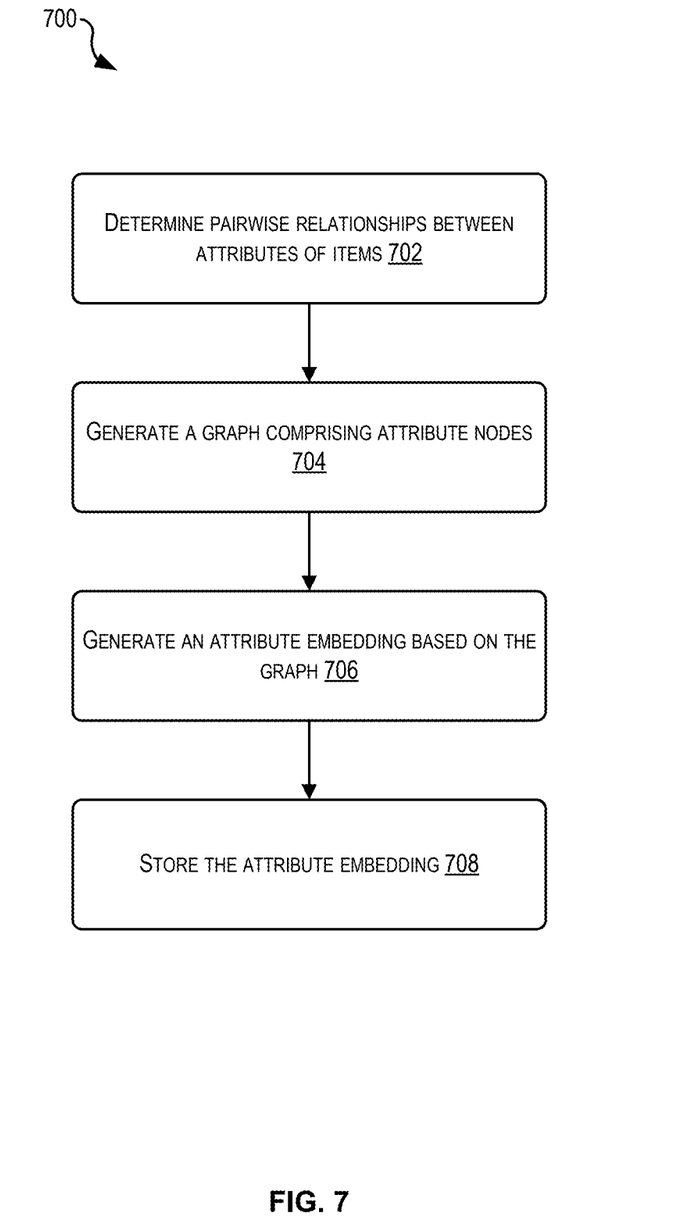
FIG. 7 is a flow diagram of an example process for generating an attribute embedding for use to generate a collection of similar items, according to some embodiments.

FIG. 7 is a flow diagram of an example process for generating an attribute embedding for use to generate a collection of similar items, according to some embodiments. The process 700 may be performed by one or more components of a computer system of a service provider (e.g., server system 602 and user device 604 of FIG. 6). The process 700 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes.

Some or all of the process 700 (or any other processes and/or methods described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The process 700 may begin at block 702, the computer system can determine pairwise relationships between attributes of items in a digital catalog. The items in the digital catalog may each be associated with one or more attributes. For example, the items may be songs with attributes including artist, genre, mood, as well as intrinsic characteristics of the songs like tempo, musical key, instruments, and the like. The pairwise relationships can determine which attributes appear together for each item. For example, a song may be labeled with three genres, so that the computer system can identify three pairwise relationships between the three genres. In some embodiments, one attribute may serve as a proxy for the items associated with that attribute. For example, the musical artist may serve as a proxy for the songs created by that artist. The artist may then be associated with each genre of the artist's songs. The computer system can then determine pairwise relationships between the genres for each artist of the digital catalog.

At block 704, the computer system can use the pairwise relationships to generate a graph comprising attribute nodes. Each attribute node can represent a corresponding attribute. For example, each node of the graph may correspond to one musical genre of the genres in the digital catalog. Each attribute node of the graph may be related to each other attribute node of the graph according to the pairwise relationships. For example, the edge connecting two attribute nodes may correspond to a value for the number of co-occurrences of the pairwise relationships. In some embodiments, the value for the edge in the graph may be determined using a weighted value for each co-occurrence, where the weighting may be determined based on additional information about the artists, genres, or the users. For example, co-occurrences with artists with more songs in the digital catalog for a given genre may be weighted more than co-occurrences between artist with fewer songs in the digital catalog.

At block 706, the computer system can generate an attribute embedding based on the graph. The attribute embedding can encode similarity information relating each attribute to each other attribute in the graph. In some embodiments, the attribute embedding may be a genre embedding for musical genres in a digital catalog of songs. In some embodiments, generating the attribute embedding can include applying a network feature learning algorithm to the graph. For example, the node2vec algorithm can be applied to the graph to generate embeddings.

At block 708, the computer system can store the attribute embedding. For example, the attribute embedding may be stored in a data store of the computer system for later retrieval for processes to use at runtime, for example to generate and/or filter collections of items based on a received request from a user device. In some embodiments, the stored attribute embedding can be retrieved and transmitted to other systems or devices for use in operations described herein. For example, the attribute embedding may be transmitted to a user device that can use the attribute embedding to generate or filter a collection of items according to the techniques described herein.

In some embodiments, the computer system can use the attribute embedding to generate a collection of items from the items in the digital catalog. In some embodiments, the computer system can use the attribute embedding to filter a collection of items determined by another component (e.g., collection model 520 of FIG. 5) of the of the computer system. For example, the computer system can receive user input indicating a selection of a musical genre and obtain a collection of songs to be played at the user device. The collection of songs can be selected using a collaborative filtering model and can include both similar songs and outlier songs. Similar songs may be songs from the digital catalog that are characterized by a similarity (e.g., a cosine similarity value close to unity) with the selected song, while outlier songs may be songs from the digital catalog characterized by a dissimilarity (e.g., a cosine similarity value close to zero) to the selected genre. Filtering the collection of items can include determining a similarity between an attribute associated with each item of the collection of items and an initial attribute. The computer system can use the information encoded in the attribute embedding to determine which items of the collection of items is most similar to a user preference (e.g., the user selection of a musical genre, an attribute of a user selected retail item, etc.). The similarity may be a cosine similarity, a negative dot product similarity, or other similarity measure. The similarities may be ranked to identify a predetermined number of the most similar items (e.g., songs most similar to the genre or genres of a seed song or a seed genre indicated by the user input). These most similar items (e.g., the similar songs) may constitute the filtered collection of items, while the items filtered from the collection of items may constitute the outlier items (e.g., outlier songs).

In some embodiments, the computer system can use the attribute embedding to generate the collection of items. For example, rather than filtering the collection of items using the attribute embedding, the computer system can generate the collection of items by determining a number of items from a digital catalog that are most similar to an initial attribute, which may be an indicated user preference, a user selection of a musical genre, a user selection of an item with an attribute, or the like. For example, the computer system can use the attribute embedding to determine a similarity value (e.g., cosine similarity, negative dot product, etc.) between an attribute of each item from the digital catalog and an attribute from the indicated user preference. The computer system can then rank the items according to the similarity values and select the number of items with the highest similarity values.

In some embodiments, the computer system can cause a user device to present a collection of items generated in accordance with the techniques described herein. For example, the computer system can stream a filtered collection of songs to a user device to play at the user device. Because the filtered collection of songs may not include outlier songs that cause the user to take actions to skip the songs, the user experience as well as the functioning of the user device are improved.

In some embodiments, the computer system can evaluate a quality of the attribute embedding. Evaluating the attribute embedding quality can include receiving a curated ontology of the attributes of items in the digital catalog. The curated ontology can specify user-selected associations between the attributes. For example, the curated ontology can define genres and sub-genres for songs in a digital catalog specified by expert user input. Evaluating the attribute embedding quality can also include generating a reproduced ontology of the attributes using the attribute embedding and determining the quality by comparing the curated ontology with the reproduced ontology. Comparing the curated ontology with the reproduced ontology can include determining whether the reproduced ontology includes a reproduced association between the first attribute and the second attribute within a predetermined number of reproduced associations between the first attribute and additional attributes. The comparison can occur for at least one user-selected association between a first attribute and a second attribute.

In some embodiments, the computer system can use the attribute embedding to update the attributes in the digital catalog to produce updated attributes. For example, a song from an artist can be tagged (e.g., by previous user input) with the genres of "Latin," "Latin pop," and "Metal." Using the attribute embedding, the computer system can determine that the genre of "Metal" is dissimilar to the genres of "Latin" and "Latin pop," and is therefore an inaccurate genre for the song. The computer system can then determine another genre label using the attribute embedding that is most similar to the remaining genres of the song and other genres associated with the artist to determine an updated genre for the song. Using the updated attributes, the computer system can then generate an updated attribute embedding by determining new pairwise relationships between the updated attributes of items in a digital catalog, generating a new graph comprising updated attribute nodes, and applying a network feature learning algorithm to the new graph to produce the updated attribute embedding.

Figure 8:
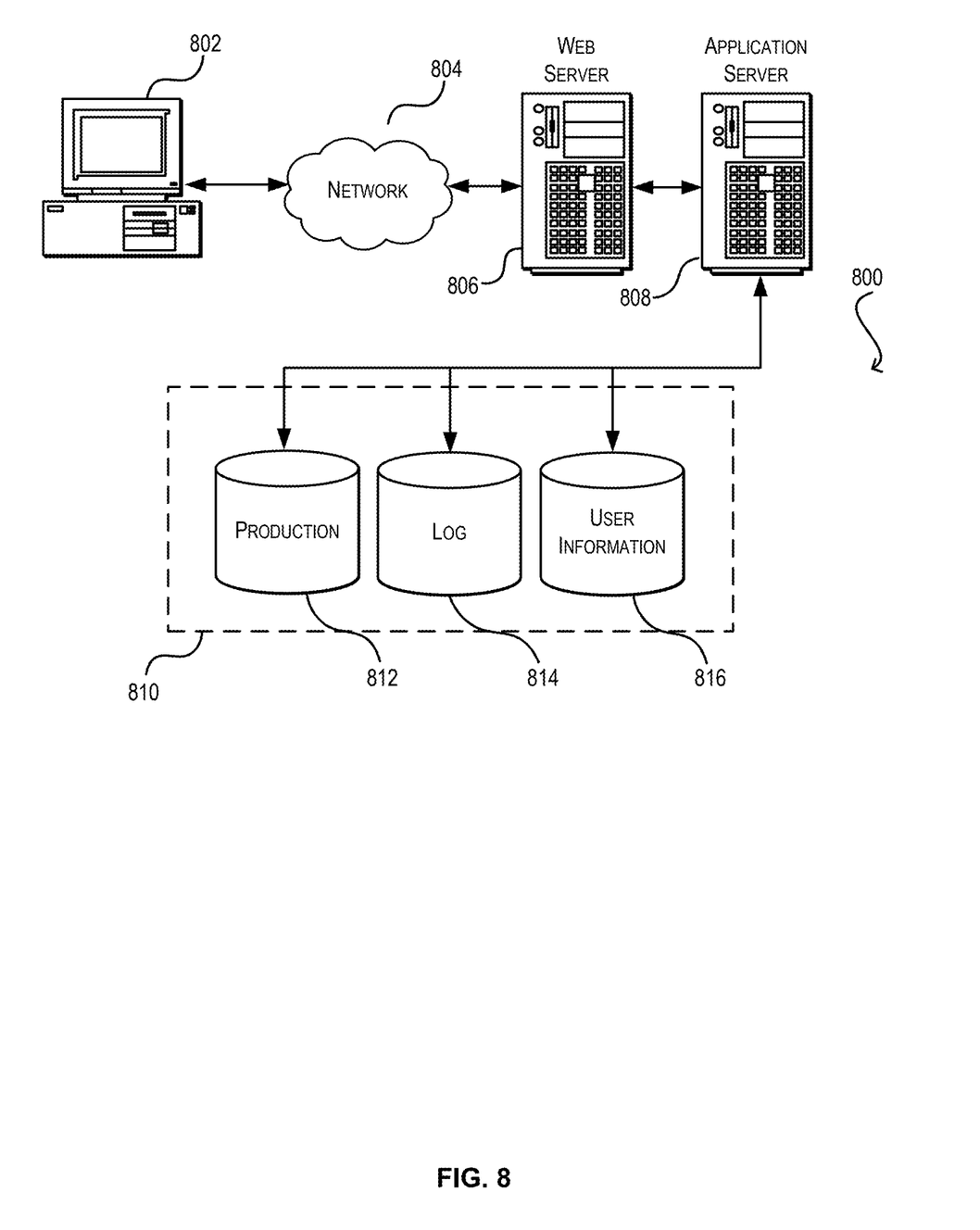
FIG. 8 illustrates an environment in which various embodiments can be implemented.

FIG. 8 illustrates aspects of an example environment 800 for implementing aspects in accordance with various embodiments. As will be appreciated, although a Web-based environment is used for purposes of explanation, different environments may be used, as appropriate, to implement various embodiments. The environment includes an electronic client device 802, which can include any appropriate device operable to send and receive requests, messages, or information over an appropriate network 804 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

In some examples, cell phones (or, more broadly, mobile phones) may be one specific type of mobile device that is an example of the electronic client device 802. In some instances, a user's mobile device may be considered their primary client device. Other example mobile devices include wearables, such as watches, worn sensors (e.g., rings, bracelets, etc.), cameras, eyeglasses, and the like, which may be considered "connected" auxiliary devices. In some examples, the combination of a user's primary mobile device and all or some of their connected, auxiliary devices, may make up a single mobile system configured to communicate with the Web server 806 or other servers over the network 804 or other networks.

The illustrative environment includes at least one application server 808 and a data store 810. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 802 and the application server 808, can be handled by the Web server. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing production data 812 and user information 816, which can be used to serve content for the production side. The data store also is shown to include a mechanism for storing log data 814, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    receiving, from a user device, user input indicating a selection of a musical genre;
    obtaining, based on the selection, a collection of songs to be played at the user device, the collection of songs comprising songs selected from a catalog based on an association with the musical genre, the collection of songs including (i) similar songs characterized by a similarity with the musical genre and (ii) outlier songs characterized by a dissimilarity with the musical genre;
    determining a genre embedding by at least:
        determining, for each musical artist of the catalog, pairwise relationships of musical genres associated with each musical artist;
        generating, using the pairwise relationships, a graph comprising genre nodes, each genre node of the graph related to each other genre node of the graph according to the pairwise relationships; and
        generating the genre embedding based on the graph;
    filtering the collection of songs by using the genre embedding to remove the outlier songs; and
    causing the user device to play a first song of the filtered collection of songs.

2. The computer-implemented method of claim 1, wherein generating the genre embedding comprises applying a network feature learning algorithm to the graph.

3. The computer-implemented method of claim 1, wherein filtering the collection of songs comprises identifying the outlier songs using the genre embedding to determine the dissimilarity.

4. The computer-implemented method of claim 1, wherein the filtered collection of songs consists of the similar songs.

5. A system, comprising:
    one or more processors; and
    one or more memories comprising instructions that, when executed by the one or more processors, cause the system to:
        determine pairwise relationships between attributes of items in a digital catalog;
        generate, using the pairwise relationships, a graph comprising attribute nodes, each attribute node of the graph related to each other attribute node of the graph according to the pairwise relationships;
        generate an attribute embedding based on the graph; and
        generate, using the attribute embedding, a collection of items from the items in the digital catalog, the collection of items associated with similarity values between an initial attribute and an item attribute of each of the items.

6. The system of claim 5, wherein generating the collection of items from the items in the digital catalog comprises:
    obtaining an initial attribute;
    determining, using the attribute embedding, the similarity values between the initial attribute and the item attribute of each of the items; and
    identifying a predetermined number of items from the collection of items based on the similarity values to generate the collection of items.

7. The system of claim 5, wherein the one or more memories store additional instructions that, when executed by the one or more processors, cause the system to further:
    obtain an initial collection of items from the digital catalog, the initial collection comprising items characterized by a similarity with an initial attribute of the attributes; and
    filtering the initial collection of items using the attribute embedding.

8. The system of claim 7, wherein filtering the initial collection of items comprises:
    determining, using the attribute embedding, a first number of the attributes characterized by similarity values between the first number of the attributes and the initial attribute; and
    selecting a second number of items of the initial collection of items, each of the second number of items comprising an item attribute from the first number of the attributes.

9. The system of claim 5, wherein the one or more memories store additional instructions that, when executed by the one or more processors, cause the system to further generate a collection of items from the items in the digital catalog by at least inputting the attribute embedding into a collaborative filtering model.

10. The system of claim 5, wherein the one or more memories store additional instructions that, when executed by the one or more processors, cause the system to further:
    receive, from a user device, a request for a collection of items;

generate the collection of items in response to the request; and cause the user device to present a first item of the collection of items at an output of the user device.

11. The system of claim 5, wherein the one or more memories store additional instructions that, when executed by the one or more processors, cause the system to further:
evaluate a quality of the attribute embedding by at least:
receiving a curated ontology of the attributes, the curated ontology specifying user-selected associations between the attributes;
generating a reproduced ontology of the attributes using the attribute embedding; and
determining the quality by comparing the curated ontology with the reproduced ontology.

12. The system of claim 11, wherein comparing the curated ontology with the reproduced ontology comprises, for at least one user-selected association between a first attribute and a second attribute, determining whether the reproduced ontology includes a reproduced association between the first attribute and the second attribute within a predetermined number of reproduced associations between the first attribute and additional attributes.

13. The system of claim 5, wherein the items are songs, and wherein the attributes comprise musical properties including tempo, musical key, or one or more musical instruments in the songs.

14. The system of claim 5, wherein the one or more memories store additional instructions that, when executed by the one or more processors, cause the system to further:
update, using the attribute embedding, the attributes in the digital catalog to produce updated attributes, the updated attributes comprising at least one attribute from the attributes corrected using the attribute embedding; and
generate, using the updated attributes, an updated attribute embedding.

15. The system of claim 14, wherein generating the updated attribute embedding comprises:

determining new pairwise relationships between the updated attributes of items in a digital catalog;
generating, using the new pairwise relationships, a new graph comprising updated attribute nodes; and
applying a network feature learning algorithm to the new graph to produce the updated attribute embedding.

16. A non-transitory computer-readable medium comprising instructions that, when executed by one or more processors, cause a computing system to:
determine pairwise relationships of musical genres associated with songs in a digital catalog;
generate, using the pairwise relationships, a graph comprising genre nodes, each genre node of the graph related to each other genre node of the graph according to the pairwise relationships; and
generate a genre embedding based on the graph.

17. The non-transitory computer-readable medium of claim 16, wherein the digital catalog comprises metadata labels for the songs the digital catalog, wherein the metadata labels including the musical genres, and storing additional instructions that, when executed by the one or more processors, cause the computing system to further:
identify, using the genre embeddings, an incorrect metadata label in the digital catalog;
determine a correct metadata label based corresponding to the incorrect metadata label; and
update the digital catalog with the correct metadata label.

18. The non-transitory computer-readable medium of claim 17, wherein the incorrect metadata label is an incorrect musical genre of a song in the digital catalog.

19. The non-transitory computer-readable medium of claim 17, wherein the incorrect metadata label is an incorrect mood of a song in the digital catalog.

20. The non-transitory computer-readable medium of claim 17, storing additional instructions that, when executed by the one or more processors, cause the computing system to further generate an updated genre embedding using the digital catalog with the correct metadata label.

* * * * *